J. A. BALL.
Dredging Bucket.

No. 236,138.  Patented Jan. 4, 1881.

WITNESSES
John H. Redstone
Frank R. Bram

INVENTOR.
John A. Ball

UNITED STATES PATENT OFFICE.

JOHN A. BALL, OF OAKLAND, CALIFORNIA.

DREDGING-BUCKET.

SPECIFICATION forming part of Letters Patent No. 236,138, dated January 4, 1881.

Application filed July 23, 1879.

*To all whom it may concern:*

Be it known that I, JOHN A. BALL, of Oakland, in the county of Alameda and State of California, have invented certain new and useful Improvements in Buckets for Dredging and Excavating Machines, of which the following is a specification, reference being had to the accompanying drawings and the letters marked thereon.

Figure 1:
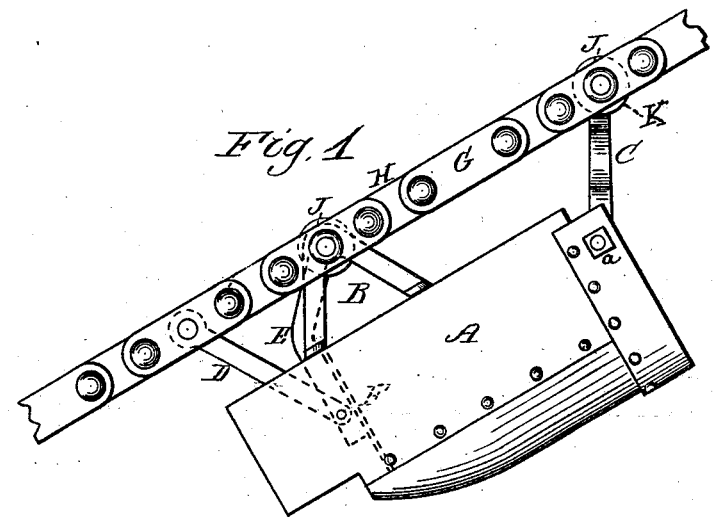
Figure 2:
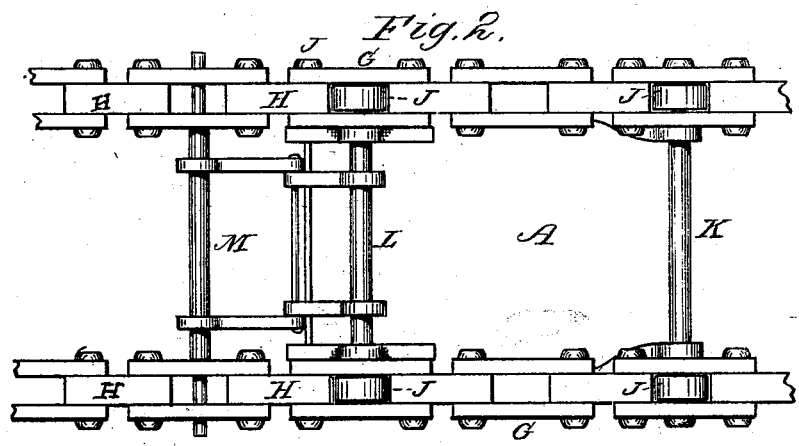
Figure 3:
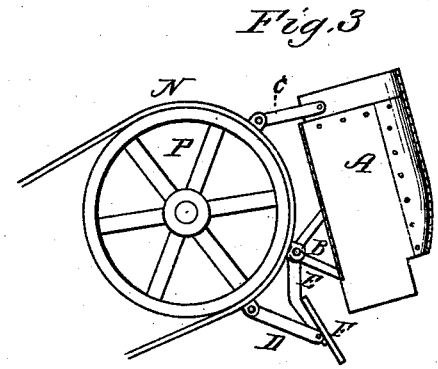

Figure 1 is a side elevation, showing a bucket with a section of the chain. Fig. 2 is a plan view, showing the inside arrangement of the bucket; and Fig. 3 is a sectional view, showing the bucket passing around the discharge-wheel.

A represents the bucket. B B represent bifurcated hangers, securely attached to the sides of the bucket at their lower ends, and provided with orifices at their upper ends for the passage of the shaft L, connecting the two chains, thus forming a hinged or pivotal connection between the bucket and shaft L; C, the forward connecting-links, pivotally attached to the bucket at their lower ends and similarly connected with the shaft K at their upper ends; D, the rear connecting-link, connecting the gate or discharge-door F with the cross-shaft M, connecting the endless belts or chains; E, the gate-link forming the pivot-connection, upon which the gate swings in opening and closing; F, the gate. G G represent open links in the chain-sections, pivotally secured to the solid links H, thus forming an endless chain. J J are bearing-rolls of the shafts K L, which rolls revolve in the openings in the links G, and are designed to carry the weight of the bucket on any suitable track or guideway for the chain. K, L, and M represent cross-shafts, upon which the attachments are made, and serve to form the cross-supports of the buckets and connect together the endless chains. N represents a belt for the buckets of an excavator. P represents a wheel for carrying the endless belts or chains to which the buckets are attached.

The following is the operation of the same: As the buckets are revolved by a chain-wheel or drum, the lower end of the ladder or frame, along which the buckets pass, has a larger drum, where the digging is done, so that the chain is not sufficiently curved or cramped to open the gate F; but when it reaches the small discharge-wheel P the bucket-gate F is thrown open, as shown in Fig. 3, discharging the same into any chute or other receptacle for conveying the dirt away.

It will be seen that other connections of the levers may be made to produce the same effect, such as attaching the same farther forward or back upon the belt or chain.

It is not at all essential that a chain be used to carry the buckets, as it will be readily seen that the same effect will be had by the use of a belt with suitable attachments for the connecting-levers.

Having thus described my invention, what I claim, and desire to secure by Letters Patent, is—

1. The bucket A, having the gate F attached to the link E, by which it is connected to the belts or chains and operated by the link D, or the mechanical equivalents, substantially in the manner and for the purposes set forth.

2. The shafts K and L, with bearing-rolls J, and the shaft M, in combination with the links C E D and hangers B, when constructed and operated substantially as and for the purposes set forth.

3. The links C, in combination with the hangers B, chains G H, and bucket A, when constructed and operated substantially as and for the purposes set forth.

4. The links D and E and gate F, when combined and operated as and for the purposes set forth.

5. The gate F, attached to the link E and operated in connection with the hangers B, connecting-links C and D, and bucket A, substantially as and for the purposes set forth.

JOHN A. BALL.

Witnesses:
JOHN H. REDSTONE,
FRANK R. BRANN.